(12) United States Patent
Wolf et al.

(10) Patent No.: US 8,618,705 B2
(45) Date of Patent: Dec. 31, 2013

(54) ELECTROMECHANICAL ARRANGEMENT FOR DRIVING AND/OR BRAKING A SHAFT

(75) Inventors: Daniel Wolf, Friedrichshafen (DE); Martin Munster, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 318 days.

(21) Appl. No.: 13/143,356

(22) PCT Filed: Jan. 29, 2010

(86) PCT No.: PCT/EP2010/051047
§ 371 (c)(1),
(2), (4) Date: Jul. 6, 2011

(87) PCT Pub. No.: WO2010/094544
PCT Pub. Date: Aug. 26, 2010

(65) Prior Publication Data
US 2011/0291503 A1 Dec. 1, 2011

(30) Foreign Application Priority Data

Feb. 19, 2009 (DE) .......................... 10 2009 001 014

(51) Int. Cl.
*H02K 7/10* (2006.01)
(52) U.S. Cl.
USPC .............................................. 310/77; 310/80
(58) Field of Classification Search
USPC ................... 310/75 R, 77–80; 188/72.1, 72.8
See application file for complete search history.

(56) References Cited

U.S. PATENT DOCUMENTS

| | | | | |
|---|---|---|---|---|
| 5,000,294 A | * | 3/1991 | Hunnicutt et al. | 188/71.9 |
| 6,158,558 A | * | 12/2000 | Bill et al. | 188/162 |
| 6,230,855 B1 | * | 5/2001 | Holding | 188/158 |
| 6,257,377 B1 | * | 7/2001 | Schumann | 188/72.8 |
| 6,349,801 B1 | * | 2/2002 | Koth et al. | 188/72.8 |
| 6,367,592 B1 | * | 4/2002 | Kapaan et al. | 188/72.1 |
| 6,554,109 B1 | * | 4/2003 | Olschewski et al. | 188/72.8 |
| 7,810,616 B2 | | 10/2010 | Nakazeki | |
| 7,938,211 B2 | | 5/2011 | Yoshino et al. | |
| 2005/0109568 A1 | * | 5/2005 | Ether | 188/156 |
| 2006/0131113 A1 | * | 6/2006 | Christof et al. | 188/72.1 |
| 2006/0169548 A1 | * | 8/2006 | Corbett et al. | 188/72.8 |
| 2010/0243387 A1 | | 9/2010 | Vollert et al. | |

FOREIGN PATENT DOCUMENTS

| | | |
|---|---|---|
| DE | 853 308 | 10/1952 |
| DE | 1 026 349 | 3/1958 |
| DE | 29 37 754 A1 | 4/1981 |
| DE | 10 2005 045 878 A1 | 3/2007 |

(Continued)

*Primary Examiner* — Thanh Lam
(74) *Attorney, Agent, or Firm* — Davis & Bujold, PLLC; Michael J. Bujold

(57) ABSTRACT

An electromechanical device for driving and/or braking a shaft (1) includes an electric motor having a rotor (2) that is rotationally fixed to the shaft (1), and a stator (4) supported in a housing (3) around the shaft (1) with a rotational degree of freedom in the peripheral direction in the direction of brake actuation. The stator (4) is operatively connected to the brake pad (7) by a device (5) that converts rotational movement of the stator (4) into axial movement of at least one brake pad (7) that is supported in an axially movable fashion such that, when the electric motor is operated as a generator, the stator (4) is rotated relative to the housing (3) by torque arising between the rotor (2) and the stator (4), such that the brake pad (7) is pressed by the device (5) against the brake disc (8).

14 Claims, 2 Drawing Sheets

(56) References Cited

FOREIGN PATENT DOCUMENTS

| DE | 10 2006 027 412 A1 | 1/2008 |
|---|---|---|
| DE | 20 2008 005 372 U1 | 8/2008 |
| DE | 10 2007 025 478 A1 | 12/2008 |
| DE | 10 2007 055 637 A1 | 5/2009 |
| EP | 1 837 555 A1 | 9/2007 |
| EP | 1 895 183 A1 | 3/2008 |
| FR | 1 134 733 | 4/1957 |
| FR | 1 254 134 | 1/1961 |
| WO | 03/091593 A1 | 11/2003 |

\* cited by examiner

US 8,618,705 B2

ELECTROMECHANICAL ARRANGEMENT FOR DRIVING AND/OR BRAKING A SHAFT

This application is a National Stage completion of PCT/EP2010/051047 filed Jan. 29, 2010, which claims priority from German patent application serial no. 10 2009 001 014.9 filed Feb. 19, 2009.

FIELD OF THE INVENTION

The present invention relates to an electromechanical device for driving and/or braking a shaft.

BACKGROUND OF THE INVENTION

The installation of hydraulic or electrohydraulic brake systems in motor vehicles is known from the prior art. When the driver actuates the brake pedal, pressure is generated in the main brake cylinder of the brake system; pressure is transferred via the brake fluid in the line up to the brake pistons in the brake calipers such that the brake pistons firmly press the brake pads against the brake disc from both sides.

DE 10 2006 027 412 A1 discloses the placement of a self-servo electromechanical braking device between a friction element and an object arranged in a movable fashion relative to the friction element in order to achieve a frictional force, the device comprising at least two friction elements that are designed to extensively contact the surface of the movably arranged object, and a first support unit for accommodating the first of the two friction elements, the first support unit being designed with at least two oppositely inclined wedge surfaces. The known brake device further comprises a second support unit that accommodates the second of the two friction elements and is designed with at least two oppositely inclined wedge surfaces, and a third support unit with at least two pairs of oppositely inclined wedge surfaces that are arranged substantially opposite the wedge surfaces of the first support unit and the wedge surfaces of the second support unit.

In addition, at least one first actuator is provided for the purpose of generating an actuating force on the first support unit or on the second support unit and a connecting element connecting the first support unit to the second support unit, the connecting element being designed to hold the first support unit and second support unit at a minimum of two different distances from each other.

In the construction known from DE 10 2006 027 412 A1, controlling the self-servo braking effect brought about by the effect of the wedges has proven to be particularly problematic.

SUMMARY OF THE INVENTION

The object of the present invention is to provide an electromechanical device for driving and/or braking a shaft that has a simple design and allows the braking effect to be easily controlled.

An electromechanical device for driving and/or braking a shaft is therefore proposed which comprises an electric motor having a rotor that is non-rotatably connected to the shaft to be braked, and a stator supported in a housing around the shaft to be braked with a rotational degree of freedom in the peripheral direction in the direction of brake actuation.

According to the invention, the stator is operatively connected to the brake pad by means of a device that converts a rotational motion of the stator into axial movement of at least one brake pad such that, when the electric motor is operated as a generator, the stator is rotated by the torque arising between the rotor and stator, whereby the brake pad is pressed against the brake disc by means of the device. The brake pad is operatively connected to a brake disc that in turn is nonrotatably connected to the shaft to be braked.

The stator is preferably operably-connected to a lead screw designed as a ball screw spindle or ball ramp such that, when the stator rotates upon actuation of the brake, the lead screw shifts axially relative to the fixed housing, and this motion is transferred via a bearing for decoupling the rotational movement to at least one axially movable brake pad supported in the housing. In this case, the stator is immovably supported relative to the housing viewed in an axial direction.

As explained above, the electric motor is operated as a generator to generate a braking torque, or it is bypassed as a part of the failsafe principle; the stator is rotated relative to the housing by means of the torque arising between the rotor and stator, whereby the brake pads are pressed against the brake discs via the axial movement of the lead screw.

In another embodiment of the invention, the stator can be designed as a part of the lead screw that is axially movable depending on its own rotational movement, or it can be fixedly connected to the lead screw.

According to a refinement of the invention, a transmission ratio step can be provided between the stator of the electric motor and the lead screw, for example, in the form of a planetary gear.

In order to prevent malfunctions, the device according to the invention for driving and/or braking, a shaft can additionally have a clutch that takes over the rotation of the stator and the actuation of the brake via a brake disc.

BRIEF DESCRIPTION OF THE DRAWINGS

The invention is described in greater detail below by way of example, with reference to the attached figures. Shown are.

DETAILED DESCRIPTION OF THE PREFERRED EMBODIMENTS

Figure 1:
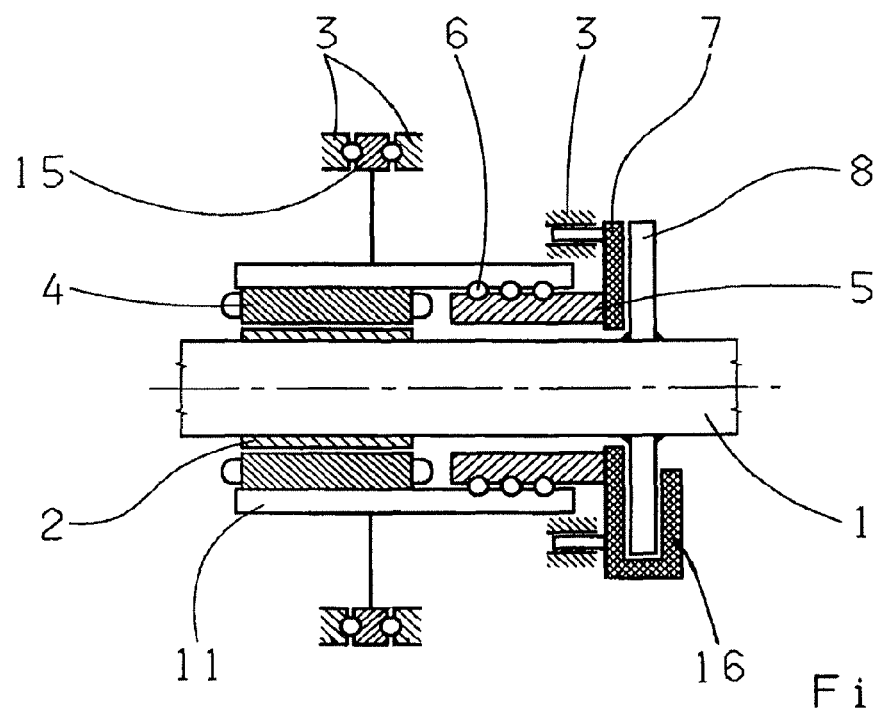
FIG. 1: a schematic sectional view of a first embodiment of an electromechanical device according to the invention for driving and/or braking a shaft.

With reference to FIG. 1, the electromechanical device, according to the invention, comprises an electric motor having a rotor 2 non-rotatably connected to a shaft 1, preferably the drive shaft, and a stator 4 that is supported in a housing 3 around the shaft 1 with a rotational degree of freedom in the peripheral direction in the direction of brake actuation, the stator being immovably mounted relative to the housing viewed in the axial direction. In FIG. 1, the axial support of the stator 4 on the housing 3 is designated with 15.

Furthermore, the device comprises a lead screw 5 designed as a ball screw spindle or ball ramp, that is actuated by rotational movement of the stator 4 which is converted into an axial shift of the lead screw 5 relative to the fixed housing 3, and this movement is transferred via a bearing 6 for decoupling the rotational movement to at least one axially movable brake pad 7 supported in the housing 3. As can be seen in FIG. 1, the brake pad 7 is operatively connected to a brake disc 8 that is non-rotatably connected to the shaft 1 to be braked.

The device according to the invention functions as follows: The electric motor is operated as a generator in order to generate braking torque, with the stator 4 being rotated relative to the housing 3 by the torque arising between the rotor 2 and stator 4, whereby the brake pad 7 is pressed against the brake disc 8 by the axial movement of the lead screw 5. The shaft in which the stator 4 is arranged is designated by the number 11.

The electric motor can also be operated as a motor; in this case, the generated torque is braced against a stop in the peripheral direction of the stator 4, whereby it is transferred to the shaft 1 via the rotor 2.

Figure 2:
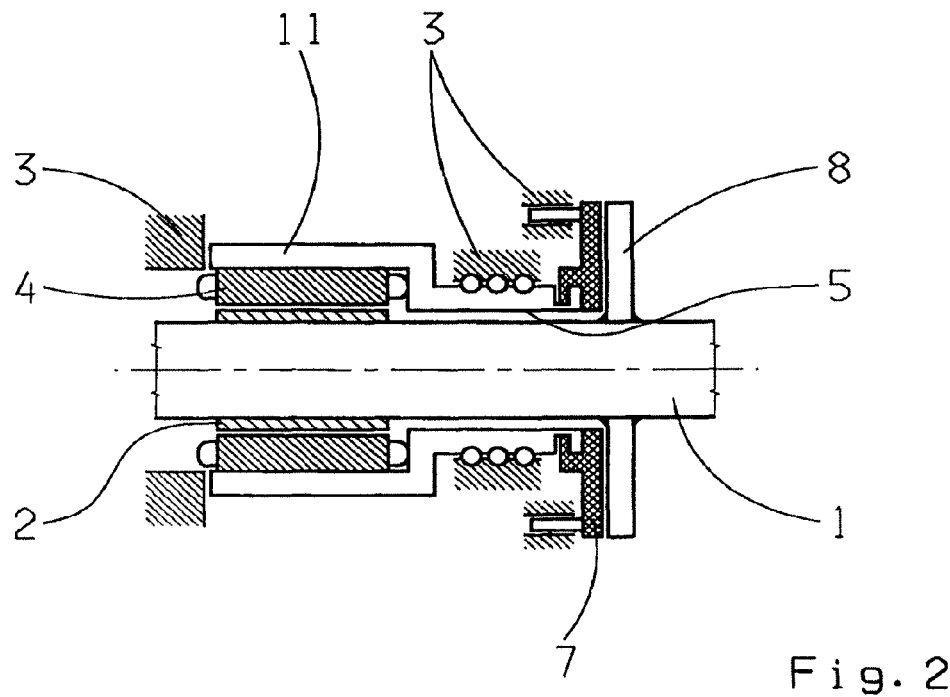
FIG. 2: a schematic side view of a second embodiment of an electromechanical device according to the invention.

The example shown in FIG. 2 differs from that shown in FIG. 1 in that the stator 4 is fixedly connected to the lead screw 5 and is designed to be axially movable as a function of its own rotational movement, with the lead screw 5 being supported on the housing 3 and being connected to the brake pad 7 in an axial direction with a keyed fit.

If the electric motor is operated as a motor, the drive torque in the embodiment shown in FIG. 2 is braced against an axial housing stop and transmitted via the rotor 2 to the shaft 1.

The design according to the invention allows the electric motor to serve as a brake when operating as a generator and to serve as a wheel hub drive when operating as a motor; mild- or mid-hybrid functions and the function of the alternator can be assumed depending on the electrical output of the motor. For the braking function, the stator executes only a few rotations in the peripheral direction, which allows the motor to be supplied with energy via a flexible cable or volute springs.

In addition, a brake acting in both directions of rotation can be realized instead of the hybrid function for the purpose of driving a shaft. To this end, the brake pad is brought into contact with the brake disc from both sides. This design is shown in FIG. 1, with the additional brake pad being provided with the reference number 16. Alternately, a brake acting in both directions of rotation can be created by a mirror-symmetrical arrangement of the described device.

Figure 3:
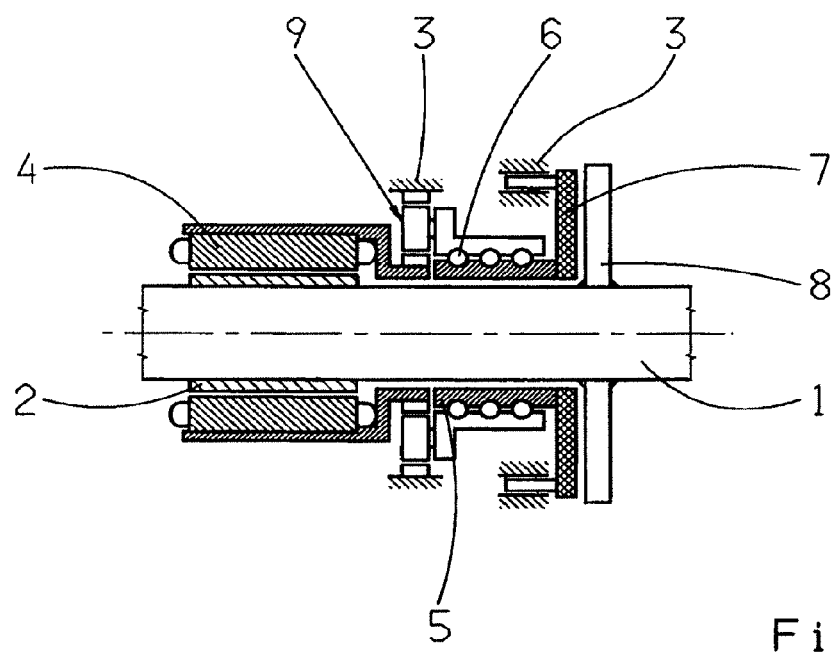
FIG. 3: a schematic side view of another embodiment of an electromechanical device according to the invention.

In the exemplary embodiment of the invention shown in FIG. 3, which represents a refinement of the device shown in FIG. 1, a transmission, which can preferably be designed as a planetary gear set 9, is provided between the stator 4 of the electric motor and the lead screw 5. As can be seen in FIG. 3, the stator 4 is non-rotatably connected to the sun gear of the planetary gear set 9, with the ring gear being coupled to the housing 3, and the lead screw 5 being connected to the carrier of the planetary gear set 9.

According to the invention, a clutch may be provided for the purpose of keeping the device from malfunctioning due to the failure of the electric motor; when engaged, this clutch preferably causes the stator to rotate and hence the brake to be actuated. The clutch is preferably designed as a single-surface magnetic clutch and, when engaged, connects the stator to the shaft to be braked. This embodiment is a refinement of the device shown in FIG. 1 and is the object in FIG. 4.

Figure 4:
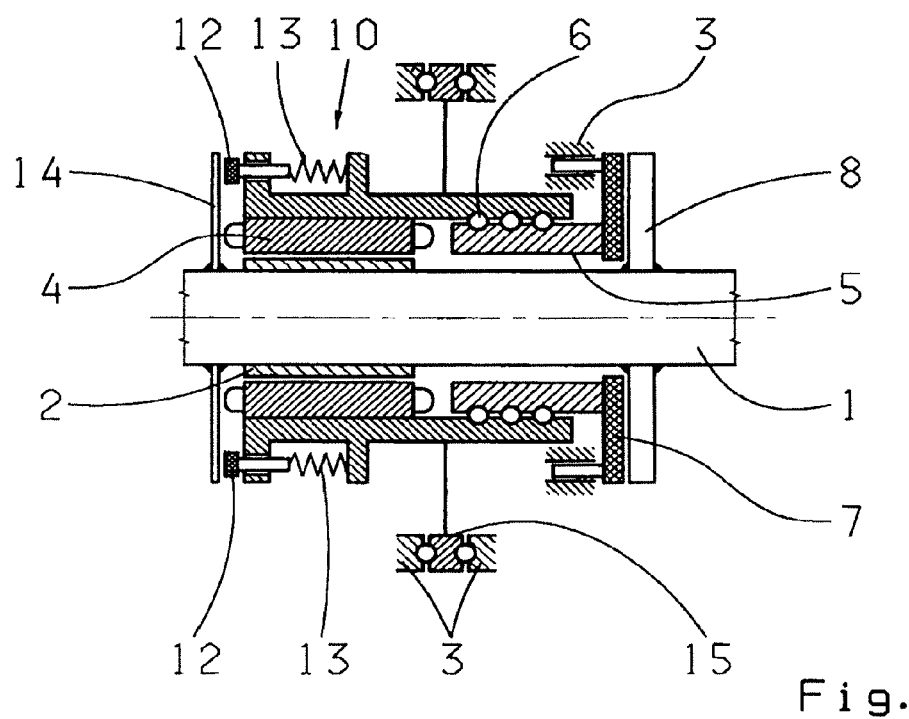
FIG. 4: a schematic side view of a fourth embodiment of an electromechanical device according to the invention.

As can be seen in FIG. 4, the device according to the invention comprises a clutch 10 that is preferably opened electromagnetically to satisfy the failsafe principle. To engage the clutch 10, at least one friction surface, preferably a tappet 12, is advanced axially by the force of at least one spring 13 and pressed against a disc 14 that is non-rotatably connected to the shaft 1 to be braked, and this causes the clutch 10 and hence the stator 4 connected to the clutch 10 to rotate. This in turn causes the device to be actuated as a brake, as mentioned above. To disengage the clutch 10, an electromagnetic device (not shown in the figure) is actuated, which moves the friction surfaces or tappet 12 to disengage the clutch 10 against the force of the spring 13.

Obviously, any structural embodiment, in particular any spatial disposition of the components of the device according to the invention individually and relative to each other, and insofar as it is technically expedient, falls under the scope of protection of the present claims, without influencing the function of the device as specified in the claims, even if these embodiments are not explicitly represented in the figures or in the description.

REFERENCE CHARACTERS

1 Shaft, output shaft
2 Rotor
3 Housing
4 Stator
5 Lead screw
6 Bearing
7 Brake pad
8 Brake disc
9 Planetary gear set
10 Clutch
11 Shaft
12 Tappet
13 Spring
14 Disc
15 Axial support of the stator
16 Brake pad

The invention claimed is:

1. An electromechanical device for at least one of driving and braking a shaft (1), the electromechanical device comprising:
   an electric motor having a rotor (2) that is fixedly connected to the shaft (1), and
   a stator (4) being supported in a housing (3) around the shaft (1) with a rotational degree of freedom in a peripheral direction in a direction of brake actuation,
   the stator (4) being operatively connected to the brake pad (7) by a device (5) that converts rotational movement of the stator (4) into axial movement of at least one brake pad (7) that is supported in an axially movable fashion such that, when the electric motor is operated as a generator, the stator (4) is rotated relative to the housing (3) by torque arising between the rotor (2) and the stator (4), the brake pad (7) is biased by the device (5) against the brake disc (8).

2. The electromechanical device for at least one of driving and braking the shaft (1) according to claim 1, wherein the device (5) is a lead screw (5) designed as one of a ball screw spindle and a ball ramp that is operatively connected to the stator (4) on one side and at least one brake pad (7) on the other side.

3. The electromechanical device for at least one of driving and braking the shaft (1) according to claim 2, wherein the stator (4) is axially fixed to the housing such that rotation of the stator (4), upon actuation of the brake, causes the lead screw (5) to shift axially relative to the fixed housing (3), and axial movement of the lead screw (5) being transferred, via a support (6) for decoupling the rotational movement to at least one axially movable brake pad (7) supported in the housing (3).

4. The electromechanical device for at least one of driving and braking the shaft (1) according to claim 3, wherein the electric motor being operable as a motor to generate drive torque that is braced against a stop in the peripheral direction of the stator (4) such that the drive torque is transferred via the rotor (2) to the shaft (1).

5. The electromechanical device for at least one of driving and braking the shaft (1) according to claim 2, wherein the stator (4) is fixedly connected to the lead screw (5) and is axially movable depending on rotational movement of the stator (4), with the lead screw (5) being supported in the housing (3) and connected to the brake pad (7) in an axial direction in a keyed fit.

6. The electromechanical device for at least one of driving and braking the shaft (1) according to claim 1, wherein the electric motor is operable as a motor to generate drive torque that is braced against an axial housing stop such that drive torque is transferred to the shaft (1) via the rotor (2).

7. The electromechanical device for at least one of driving and braking the shaft (1) according to claim 2, wherein a transmission is provided between the stator (4) of the electric motor and the lead screw (5).

8. The electromechanical device for at least one of driving and braking the shaft (1) according to claim 7, wherein the transmission is a planetary gear set (9).

9. The electromechanical device for at least one of driving and braking the shaft (1) according to claim 8, wherein the stator (4) is fixedly connected to a sun gear of the planetary gear set (9), a ring gear of the planetary gear set (9) is coupled to the housing (3), and the lead screw (5) is connected to a carrier of the planetary gear set (9).

10. The electromechanical device for at least one of driving and braking the shaft (1) according to claim 2, wherein the device further comprises a clutch (10) which, when actuated, causes the brake to be actuated such that the brake is prevented from malfunctioning due to a failure of the electric motor.

11. The electromechanical device for at least one of driving and braking the shaft (1) according to claim 10, wherein the clutch, when engaged, connects the stator (4) to the shaft (1) to be braked, and causes rotation of the stator (4) and thus actuation of the brake.

12. The electromechanical device for at least one of driving and braking the shaft (1) according to claim 11, wherein the clutch (10) is disengaged electromagnetically.

13. The electromechanical device for at least one of driving and braking the shaft (1) according to claim 11, wherein a least one friction surface (12) is pressed by a force of at least one spring (13) against a disc (14) that is non-rotatably connected to the shaft (1) to be braked such that the clutch (10), and thus the stator (4) connected to the clutch (10), rotate which causes the brake to be actuated, and an electromagnetic device is actuated to disengage the clutch (10) and move the friction surfaces (12) in a disengaging direction of the clutch (10) against the force of the spring (13).

14. The electromechanical device for at least one of driving and braking the shaft (1) according to claim 10, wherein the clutch is a single-surface magnetic clutch.

\* \* \* \* \*